(12) United States Patent
Park (10) Patent No.: US 7,496,005 B2
(45) Date of Patent: Feb. 24, 2009

(54) RECORDING MEDIUM, AND METHOD AND APPARATUS OF CONTROLLING ACCESS TO THE RECORDING MEDIUM

(75) Inventor: Yong Cheol Park, Gwachon-si (KR)

(73) Assignee: LG Electronics Inc., Seoul (KR)

( * ) Notice: Subject to any disclaimer, the term of this patent is extended or adjusted under 35 U.S.C. 154(b) by 813 days.

(21) Appl. No.: 11/185,837

(22) Filed: Jul. 21, 2005

(65) Prior Publication Data

US 2006/0018213 A1 Jan. 26, 2006

Related U.S. Application Data

(60) Provisional application No. 60/589,803, filed on Jul. 22, 2004.

(30) Foreign Application Priority Data

Jun. 14, 2005 (KR) ...................... 10-2005-0051030

(51) Int. Cl.
*G11B 7/00* (2006.01)

(52) U.S. Cl. .............. 369/30.03; 369/47.27; 369/59.25; 369/275.3

(58) Field of Classification Search ........................ None
See application file for complete search history.

(56) References Cited

U.S. PATENT DOCUMENTS

| | | |
|---|---|---|
| 5,237,553 A | 8/1993 | Fukushima et al. |
| 5,552,776 A | 9/1996 | Wade et al. |
| 5,815,485 A | 9/1998 | Tanaka et al. |
| 6,115,346 A | 9/2000 | Sims, III |
| 6,351,788 B1 | 2/2002 | Yamazaki et al. |
| 6,526,522 B1 | 2/2003 | Park et al. |
| 6,580,684 B2 | 6/2003 | Miyake et al. |
| 6,621,783 B1 | 9/2003 | Murata |
| 6,691,209 B1 | 2/2004 | O'Connell |
| 6,725,200 B1 | 4/2004 | Rost |

(Continued)

FOREIGN PATENT DOCUMENTS

EP 0 495 471 A2 7/1992

(Continued)

OTHER PUBLICATIONS

Chan M.Y. et al.: "Two Simple Schemes for Access Control", IEEE International Symposium on Information Theory, Sep. 17-22, 1995, p. 355.

(Continued)

*Primary Examiner*—Muhammad N. Edun
(74) *Attorney, Agent, or Firm*—Harness, Dickey & Pierce, P.L.C.

(57) ABSTRACT

A recording medium, and a method and apparatus of controlling an access to the recording medium are disclosed. Physical access control (PAC) information that is pre-recorded on a recording medium is extracted. Then, a PAC identification is extracted from the PAC information. An access to the recording medium is controlled using first control information that is included in the PAC information, when the PAC identification is known. Alternatively, the access to the recording medium is controlled using second control information that is included in the PAC information, when the PAC identification is unknown.

24 Claims, 8 Drawing Sheets

U.S. PATENT DOCUMENTS

| | | |
|---|---|---|
| 6,912,188 B2 | 6/2005 | Morishima |
| 6,963,523 B1 | 11/2005 | Park |
| 7,230,893 B2 | 6/2007 | Park |
| 2002/0036643 A1 | 3/2002 | Namizuka et al. |
| 2002/0078295 A1 | 6/2002 | Shaath et al. |
| 2002/0136118 A1 | 9/2002 | Takahashi |
| 2003/0048731 A1 | 3/2003 | Ozaki |
| 2003/0137915 A1 | 7/2003 | Shoji et al. |
| 2003/0210627 A1 | 11/2003 | Pope et al. |
| 2003/0212564 A1 | 11/2003 | Sawabe et al. |
| 2004/0013061 A1 | 1/2004 | Wu |
| 2004/0174793 A1 | 9/2004 | Park et al. |
| 2004/0218488 A1 | 11/2004 | Hwang et al. |
| 2004/0246852 A1 | 12/2004 | Hwang et al. |
| 2005/0169132 A1 | 8/2005 | Kuraoka et al. |
| 2005/0195716 A1 | 9/2005 | Ko et al. |
| 2005/0207318 A1 | 9/2005 | Park |
| 2007/0053267 A1 | 3/2007 | Brondijk |

FOREIGN PATENT DOCUMENTS

| | | |
|---|---|---|
| EP | 1 061 517 A1 | 12/2000 |
| EP | 1 251 508 A2 | 10/2002 |
| EP | 1 329 888 A1 | 7/2003 |
| EP | 1 381 047 A1 | 1/2004 |
| EP | 1505597 | 2/2005 |
| EP | 1587102 | 10/2005 |
| JP | 06-259886 | 9/1994 |
| JP | 11-039801 | 2/1999 |
| JP | 2002-124037 | 4/2002 |
| JP | 2002-278821 | 9/2002 |
| JP | 2002-328848 | 11/2002 |
| JP | 2004-030779 | 1/2004 |
| WO | 03/030173 | 4/2003 |
| WO | WO 03/102936 A1 | 12/2003 |
| WO | WO 04/001753 A1 | 12/2003 |
| WO | WO 04/001754 A1 | 12/2003 |
| WO | WO 2004/019326 A1 | 3/2004 |
| WO | WO 2004/081936 A1 | 9/2004 |
| WO | 2005/086598 | 9/2005 |

OTHER PUBLICATIONS

International Search Report mailed Dec. 20, 2005 in corresponding International Patent Application No. PCT/KR2005/002345.

U.S. Patent Office Action dated May 13, 2008, for U.S. Appl. No. 11/061,665.

European Patent Office Action dated May 14, 2008, for European Patent Application No. 04808643.3-2223.

European Patent Office Search Report dated May 15, 2008, for European Patent Application No. 07111355.9-2223.

Blu-Ray Disc Association, "Rewritable Blu-Ray Disc (BD-RE) Multi-Media Command Set Description, Version 0.80", [Online] Nov. 9, 2004.

Search Report issued May 23, 2008 by the European Patent Office in counterpart European Patent Application No. 07120363.2-2223.

Search report issued Aug. 4, 2008 by the European Patent Office in counterpart European Patent Application No. 07110264.4-2223.

Search report issued Jul. 30, 2008 by the European Patent Office in counterpart European Patent Application No. 07150328.8-2223.

Office Action issued Sep. 12, 2008 by the USPTO in counterpart U.S. Appl. No. 11/155,485.

Office Action issued Sep. 3, 2008 by the USPTO in counterpart U.S. Appl. No. 11/085,134.

| Data Frame | Contents | Number of bytes | |
|---|---|---|---|
| 0 | PAC_ID | 3 | 00 00 00h : original unused PAC cluster<br>FF FF FF FFh : previously used and now unused PAC cluster<br>50 52 4Dh : primary PAC cluster<br>Others : non-primary PAC cluster |
| 0 | PAC format/Update Count | 5 | |
| 0 | Unknown PAC Rules | 4 | |
| 0 | Unknown PAC Entire_Disc_Flags | 1 | |
| 0 | reserved and set to 00h | 2 | |
| 0 | Number of segments | 1 | |
| 0 | Segment_0 | 8 | |
| 0 | ... | 30*8 | |
| 0 | Segment_31 | 8 | |
| 0 | reserved and set to 00h | 112 | |
| 0 | Known PAC Rules | 4 | |
| 0 | Known PAC Entire_Disc_Flags | 1 | |
| 0 | PAC specific information | 1659 | |
| 1 | PAC specific information | 2048 | |
| ... | | | |
| 30 | PAC specific information | 2048 | |
| 31 | reserved and set to 00h | 2048 | |

Unknown PAC Rules/Known PAC Rules

| Area | | | Bits | |
|---|---|---|---|---|
| | | | $b_{31}$ to $b_{24}$ | reserved |
| INFO 2 | | Reserved 8 | $b_{23}$ | write |
| | | | $b_{22}$ | read |
| | | Reserved 7 | $b_{21}$ | write |
| | | | $b_{20}$ | read |
| | | Reserved 6 | $b_{19}$ | write |
| | | | $b_{18}$ | read |
| | | Reserved 5 | $b_{17}$ | write |
| | | | $b_{16}$ | read |
| INFO 1 | | Drive Area | $b_{15}$ | write |
| | | | $b_{14}$ | read |
| INFO 1 | | Reserved 3 | $b_{13}$ | write |
| | | | $b_{12}$ | read |
| | | Reserved 2 | $b_{11}$ | write |
| | | | $b_{10}$ | read |
| | | Reserved 1 | $b_9$ | write |
| | | | $b_8$ | read |
| INFO 1,2,3,4 | | DMA Zones(not including the DDS) | $b_7$ | write |
| Data Zone | | Spare Areas | $b_6$ | write |
| INFO 1,2,3,4 | | Control Data Zones | $b_5$ | write |
| | | | $b_4$ | read |
| Data Zones | | User Data Area/ Segments | $b_3$ | write |
| | | | $b_2$ | read |
| INFO 1&2 | | PAC Cluster | $b_1$ | write |
| | | | $b_0$ | read |

Control information

0b: writing/reading in the related zone/area is allowed
1b: writing/reading in the related zone/area is not allowed

RECORDING MEDIUM, AND METHOD AND APPARATUS OF CONTROLLING ACCESS TO THE RECORDING MEDIUM

This application claims the benefit of Korean Patent Application No. 10-2005-0051030, filed on Jun. 14, 2005, which is hereby incorporated by reference as if fully set forth herein.

This application claims the benefit of U.S. Provisional Application No. 60/589,803, filed on Jul. 22, 2004, in the name of inventor Yong Cheol PARK, titled "METHOD OF PHYSICAL ACCESS CONTROL IN BLU-RAY DISC", which is hereby incorporated by reference as if fully set forth herein.

BACKGROUND OF THE INVENTION

1. Field of the Invention

The present invention relates to a recording medium, and more particularly, to a recording medium, and a method and apparatus of controlling an access to the recording medium, which use information for controlling physical access in the recording medium in order to control the recording and/or reproducing of the data on/from the recording medium, and which perform re-initialization of the recording medium.

2. Discussion of the Related Art

Optical discs are widely used for recording a large quantity of data. Among such optical discs, new high density optical media, such as the Blu-ray Disc (hereinafter referred to as "BD") are under development, which enable long time recording and storing of high definition video and audio data. Currently, a global standard technical specification of the Blu-ray disc, which is considered to be a next generation recording medium technology as a data storing solution that significantly surpasses the present DVD, is under development along with other digital apparatuses.

Accordingly, adopting a Physical Access Control (PAC) area for recording data controlling physical access of the recording medium, as a new function of the blu-ray disc is under discussion. However, a standard for such function has not yet been consolidated. Therefore, there exist some difficulties in fabricating a complete optical recording and reproducing apparatus.

SUMMARY OF THE INVENTION

Accordingly, the present invention is directed to a recording medium, and a method and apparatus of controlling an access to the recording medium that substantially obviate one or more problems due to limitations and disadvantages of the related art.

An object of the present invention is to provide a method and apparatus of controlling an access to the recording medium for performing various control operations related to the recording and reproducing of the recording medium by using the recorded data.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of controlling an access to a recording medium includes extracting physical access control (PAC) information pre-recorded on a recording medium, extracting a PAC identification from the PAC information, controlling an access to the recording medium using first control information included in the PAC information when the PAC identification is known, and controlling the access to the recording medium using second control information included in the PAC information when the PAC identification is unknown.

In another aspect of the present invention, a method of controlling an access to a recording medium includes extracting physical access control (PAC) information pre-recorded on a recording medium, extracting a PAC identification from the PAC information, determining whether re-initialization of the recording medium is permitted based upon first control information included in the PAC information when the PAC identification is known, determining whether the re-initialization is permitted based upon second control information included in the PAC information when the PAC identification is unknown, and controlling the access to the recording medium for the re-initialization of the recording medium when it is permitted by the first or second control information.

In another aspect of the present invention, a method of controlling an access to a recording medium includes extracting physical access control (PAC) information pre-recorded on a recording medium, extracting a PAC identification from the PAC information, determining whether an access to at least one specific area of the recording medium is permitted based upon first control information included in the PAC information when the PAC identification is known, determining whether the access is permitted based upon second control information included in the PAC information when the PAC identification is unknown, and accessing to the at least one specific area of the recording medium when it is permitted.

In another aspect of the present invention, a recording medium includes a lead-in area including a physical access control (PAC) area in which at least one PAC cluster is recorded, each PAC cluster including a PAC identification, first control information, and second control information, wherein the first control information indicates whether an access to at least one specific area of the recording medium is permitted when the PAC identification is known to an access system, and the second control information indicates whether the access is permitted when the PAC identification is unknown to the access system.

In another aspect of the present invention, a recording medium includes a lead-in area including a physical access control (PAC) area in which at least one PAC cluster is recorded, each PAC cluster including a PAC identification, first control information, and second control information, wherein the first control information indicates whether re-initialization of the recording medium is permitted when the PAC identification is known to an access system, and the second control information indicates whether the re-initialization is permitted when the PAC identification is unknown to the access system.

In another aspect of the present invention, an apparatus of controlling an access to a recording medium includes an accessing unit configured to extract physical access control (PAC) information pre-recorded on a recording medium, to extract a PAC identification from the PAC information, to determine whether an access to at least one specific area of the recording medium is permitted based upon first control information included in the PAC information when the PAC identification is known, and to determine whether the access is permitted based upon second control information included in the PAC information when the PAC identification is unknown, and a controller configured to control the access to the at least one specific area based upon the first or second control information.

In a further aspect of the present invention, an apparatus of controlling an access to a recording medium includes an accessing unit configured to extract physical access control (PAC) information pre-recorded on a recording medium, to extract a PAC identification from the PAC information, to determine whether re-initialization of the recording medium is permitted based upon first control information included in the PAC information when the PAC identification is known, and to determine whether the re-initialization is permitted based upon second control information further included in the PAC information when the PAC identification is unknown, and a controller configured to control the access to the recording medium for the re-initialization of the recording medium when it is permitted by the first or second control information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

In this detailed description, "recording medium" refers to all types of medium that can record data and broadly includes all types of medium regardless of the recording method, such as an optical disc, a magnetic tape, and so on. Hereinafter, for simplicity of the description of the present invention, the optical disc and, more specifically, the "Blu-ray disc (BD)" will be given as an example of the recording medium proposed herein.

Also, the "Physical Access Control (PAC)" used in the present invention refers to a general concept of controlling physical access to the recording medium. Accordingly, for example, a "PAC area" refers to an area having the PAC related control information recorded within the recording medium. A "PAC cluster" refers to a recording unit provided within the PAC area, which will be described in detail in a later process.

In the present invention, "re-initialization" refers to a process of re-formatting the recording medium due to a specific reason during the use of the recording medium, such as a re-writable optical disc. More specifically, the process of re-initialization must be performed only under the condition that re-initialization is authorized so as to protect the pre-recorded data within the recording medium. A preferred method of providing information authorizing re-initialization to the PAC cluster will be described in detail in a later process.

Figure 1:
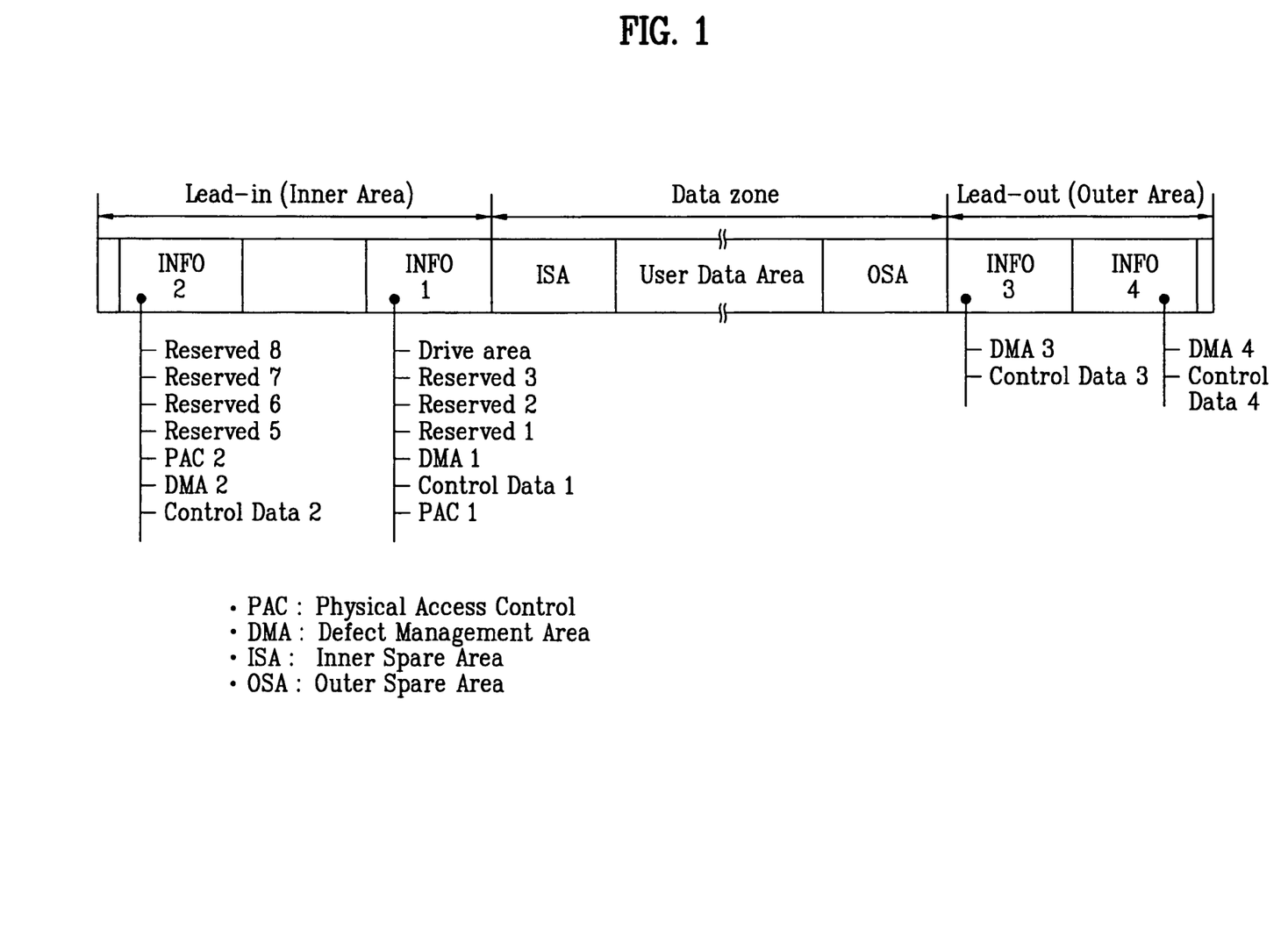
FIG. 1 illustrates a physical structure of a recording medium according to the present invention.

FIG. 1 illustrates a physical structure of a recording medium according to the present invention. Referring to FIG. 1, the recording medium (e.g., the optical disc), includes a lead-in area and a lead-out area for recording diverse information for managing the disc on an inner area and an outer area of the disc. The optical disc (or recording medium) also includes a data zone for recording data, which a user actually wishes to record, between the lead-in area and the lead-out area. In addition, a plurality of info areas ("INFO1" to "INFO4") is included in the lead-in area and the lead-out area. Diverse information for managing the optical disc is recorded on the info areas. The data zone includes a user data area and a spare area (ISA, OSA). The user data area is for recording data which the user actually wishes to record. And, the spare area is used as a replacement area for defect management.

The "INFO1" area within the lead-in area includes a drive area, a first defect management area (DMA 1), a first control data area (Control Data 1), and a first PAC area (PAC 1). The drive area is for recording information on an optical recording and reproducing apparatus (also referred to as a "drive") that has accessed the optical disc. The first defect management area (DMA 1) manages defect occurring within the disc, and the first control data area (Control Data 1) includes general control information. The first PAC area (PAC 1) is for controlling physical access to the disc, i.e., whether to record or reproduce data corresponding to a specific area within the optical disc. The remaining areas of the "INFO1" area are reserved as reserved areas (Reserved 1, 2, and 3) for future usage.

The "INFO2" area within the lead-in area includes a second defect management area (DMA 2), a second control data area (Control Data 2), and a second PAC area (PAC 2). The second defect management area (DMA 2) manages defect occurring within the disc, and the second control data area (Control Data 2) includes general control information. The second PAC area (PAC 2) is for controlling physical access to the disc, i.e., whether to record or reproduce data corresponding to a specific area within the optical disc. The remaining areas of the "INFO1" area are reserved as reserved areas (Reserved 5, 6, 7, and 8) for future usage. Additionally, the "DMA 2" and "PAC 2" areas included in the "INFO2" area correspond to the above-described "DMA 1" and "PAC 1" areas included in the "INFO1" area, respectively, wherein identical information is recorded in an identical method. Furthermore, another area including an optimum power calibration (OPC) area for calculating optimum recording power, and a reserved area (Reserved 4) reserved for future usage may be included between the "INFO1" area and the "INFO2" area. However, this area has little relevance with the aspect of the present invention and has, therefore, been omitted from the drawing.

The "INFO3" area within the lead-out area includes a third defect management area (DMA 3), and a third control data area (Control Data 3). The third defect management area (DMA 3) manages defect occurring within the disc, and the third control data area (Control Data 3) includes general control information. In addition, the "INFO4" area within the lead-out area includes a fourth defect management area (DMA 4), and a fourth control data area (Control Data 4). The fourth defect management area (DMA 4) manages defect occurring within the disc, and the fourth control data area (Control Data 4) includes general control information. Accordingly, each of the areas described in FIG. 1 are individually authorized for recording and reading. Such authorization will be described in detail in a later process with reference to FIG. 5.

Figure 2:
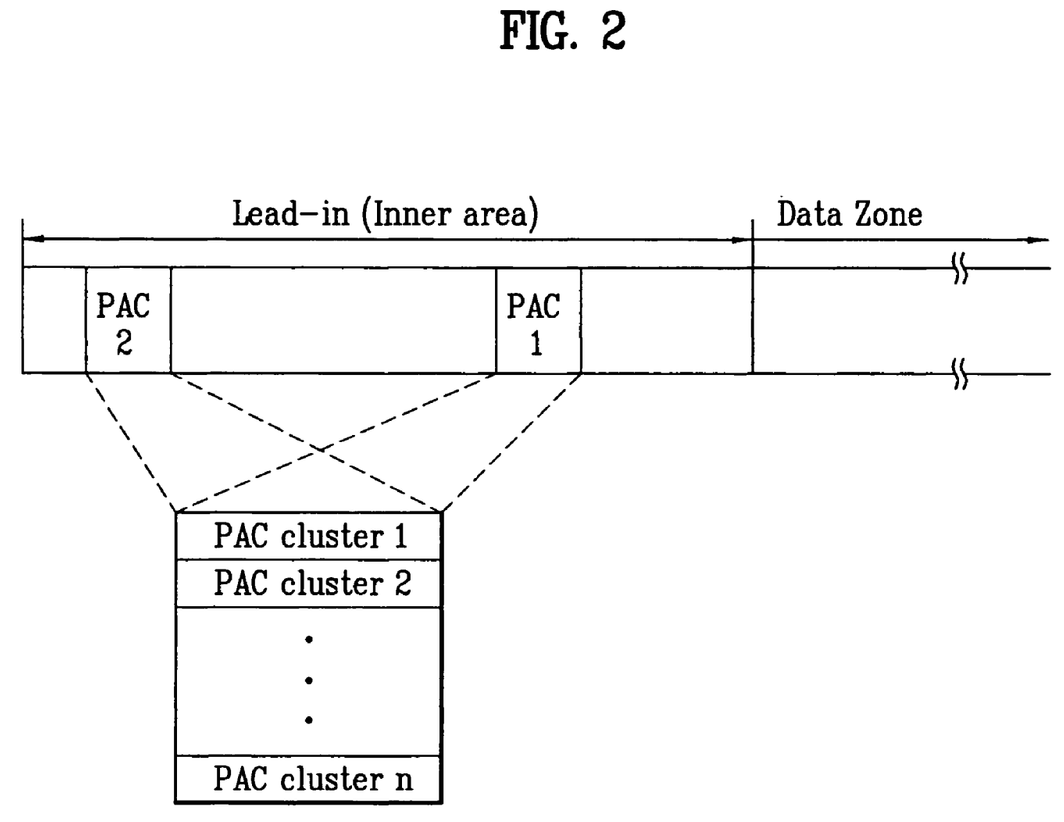
FIG. 2 illustrates a PAC cluster within a Physical Access Control (PAC) area of the recording medium according to the present invention.

FIG. 2 illustrates a PAC cluster within a Physical Access Control (PAC) area of the recording medium according to the present invention. As described above, PAC areas (PAC 1, PAC 2) are provided on one side of the "INFO1" area and the "INFO2" area. Herein, the PAC area consists of a plurality of recording units, e.g., n number of PAC clusters (PAC cluster 1~PAC cluster n). Accordingly, by recording the same information on PAC1 and PAC2, the information within the PAC area can be protected with more reliability. More specifically, each PAC cluster includes information for controlling physical access to the disc. The control information that is recorded within the PAC cluster will be described in detail with reference to FIG. 3 to FIG. 5 in a later process.

Figure 3:
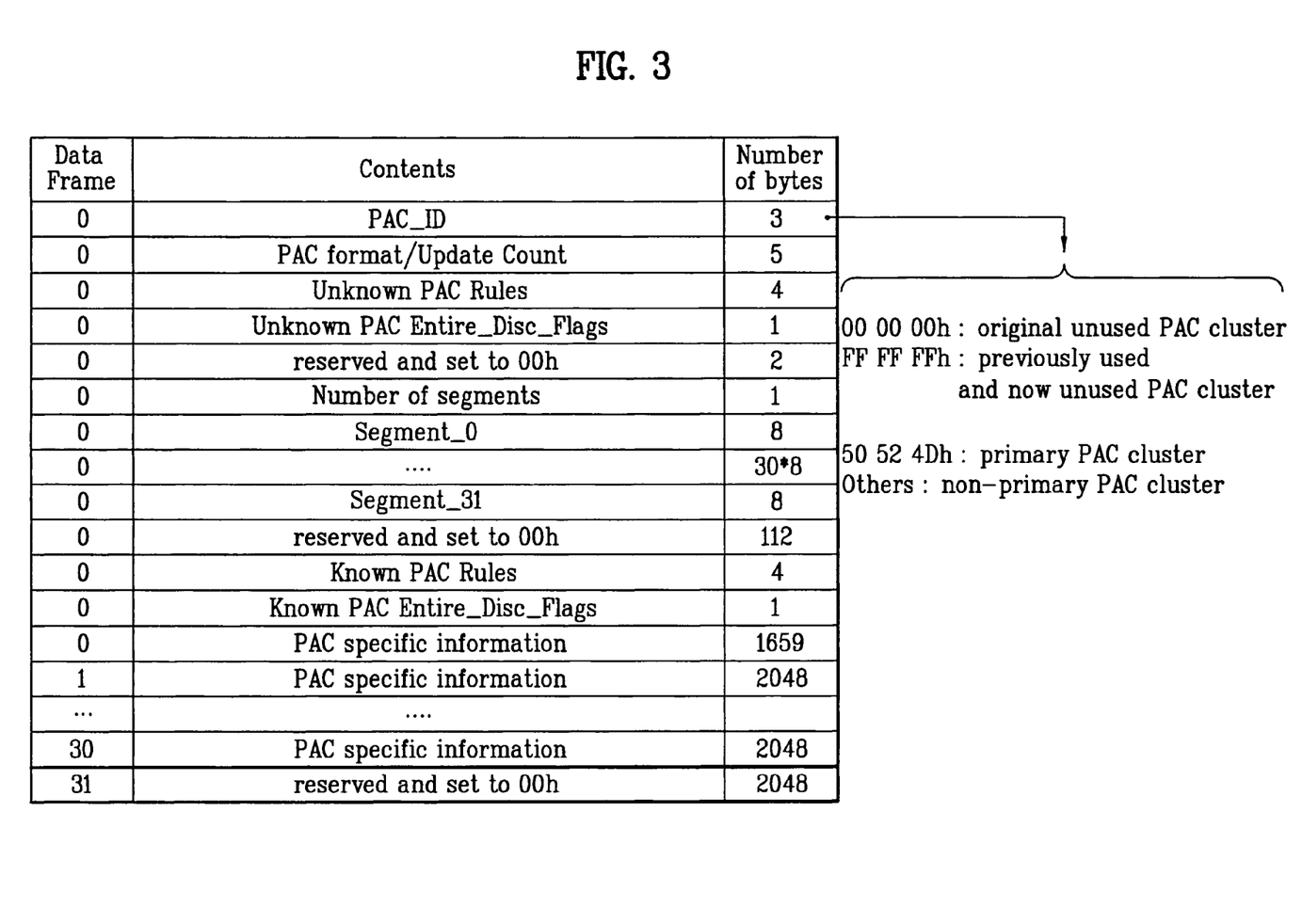
FIGS. 3 and 4 illustrate a PAC cluster information of the recording medium according to the present invention.

FIG. 3 illustrates information being recorded in each PAC cluster. Referring to FIG. 3, as a recording unit, a cluster is formed of 32 data frames. Herein, each data frame includes 2048 bytes of data. More specifically, a general information is recorded on a portion of a first data frame (Data Frame 0) within the PAC cluster as a PAC header information. A "PAC specific information" of a corresponding PAC is recorded in the remaining 31 data frames (Data Frame 1~Data Frame 31) and the area of the first data frame (Data Frame 0) excluding the header information area. Evidently, in certain embodiments, the last data frame (Data Frame 1) may also be left out as a reserved area, as shown in FIG. 3.

The PAC header information, which is recorded on a portion of the first data frame (Data Frame 0) within the PAC cluster, includes a "PAC_ID" field, a "PAC Format" field, and an "Update count" field. The "PAC_ID" field is an identification information indicating the type of the corresponding PAC cluster. The "PAC Format" field records a format version of the PAC cluster. And, the "Update count" field records the number of updates made. Additionally, when using an optical recording and reproducing apparatus that can identify the "PAC_ID" field, a "Known PAC Rules" field and a "Known PAC Entire_Discs_flags" field are recorded in the PAC header information, as a first control information for controlling physical access to the disc. Alternatively, when using an optical recording and reproducing apparatus that cannot identify the "PAC_ID" field, an "Unknown PAC Rules" field and an "Unknown PAC Entire_Discs_flags" field are recorded in the PAC header information, as a second control information for controlling physical access to the disc. Furthermore, a "segment" information designating a specific area within the disc that is controlled by the "Unknown PAC Rules" field, and a maximum of 32 segments may be included within the disc. A "Number of segments" field and a "Segment_i (i=0~31)" field are also recorded in the PAC header information. Herein, the "Number of segments" field indicate the number of segments existing in the current PAC cluster, and the "Segment_i (i=0~31)" field includes position information of each segment within the disc. Furthermore, general information and control information specific to the corresponding PAC cluster, which an optical recording and reproducing apparatus that can identify the "PAC_ID" field may refer to when recording and reproducing the optical disc, are recorded in a plurality of "PAC specific information" field.

Each PAC cluster is formed to have a data structure as shown in FIG. 3. However, if the above-described specific field is not used, all of the bytes existing within the corresponding cluster may be set as "00h", thereby indicating that the field is currently not being used. More specifically, for example, the "Number of segments" filed is recorded as '2', and start address and end address information within the disc of the corresponding segment are recorded in the "Segment_0" field and the "Segment_1" field. However, all of the bytes existing in each of the remaining "Segment_2" to "Segment_31" fields are set a "00h". Similarly, among the "PAC specific information" fields, all of the bytes existing within the unused fields may also be set as "00h".

In the present invention, the above-described "PAC_ID" information has an important meaning. More specifically, depending upon whether the "PAC_ID" information is identified by the optical recording and reproducing apparatus, if the "PAC_ID" information can be identified, the control information recording in the "Known PAC Rules" field and the "Known PAC Entire_Disc_flags" field, as the first control information, is used. On the other hand, if the "PAC_ID" information cannot be identified, the control information recording in the "Unknown PAC Rules" field and the "Unknown PAC Entire_Disc_flags" field, as the second control information, is used. In the present invention, the PAC clusters may be classified into three different types: an "unused PAC cluster", a "primary PAC cluster", and a "non-primary PAC cluster". The unused PAC cluster refers to the PAC clusters that are not used. All discs must forcibly include at least one primary PAC cluster within the PAC cluster. The non-primary PAC cluster is used to describe PAC clusters that are not defined as an unused PAC cluster or a primary cluster.

Therefore, if the PAC_ID of three (3) bytes is "PAC_ID=00 00 00h", the corresponding PAC cluster is defined as an unused PAC cluster. However, since it has never been used before, the PAC cluster is defined as an "original unused PAC cluster". Alternatively, if the PAC_ID of three (3) bytes is "PAC_ID=FF FF FFh", the corresponding PAC cluster is defined as an unused PAC cluster. However, since it has been used once in the past but not used presently, the PAC cluster is defined as a "now unused PAC cluster". Furthermore, if the PAC_ID of three (3) bytes has a specific value predetermined as a standard value, such as "PAC_ID=50 52 4Dh", the PAC cluster is defined as a primary PAC cluster. And, if the PAC_ID has a value different from the above-mentioned specific standard value, the PAC cluster is defined as a non-primary PAC cluster.

The non-primary PAC cluster may be defined by various PAC_ID values. However, the values should be determined as standard values. More specifically, at the point of standardizing the non-primary PAC cluster, the corresponding PAC_ID is decided as the standard value. Therefore, the optical recording and reproducing apparatus that is manufactured prior to the standardization will not be able to identify the PAC_ID of the non-primary PAC cluster. And, when the apparatus is unable to identify the PAC_ID of the specific non-primary PAC cluster, then the access to the disc for recording and reproducing data is controlled in accordance with the "Unknown PAC Rules" field and the "Unknown PAC Entire_Disc_flags" field that are recorded, as the second control information, within the corresponding PAC cluster.

Figure 4:
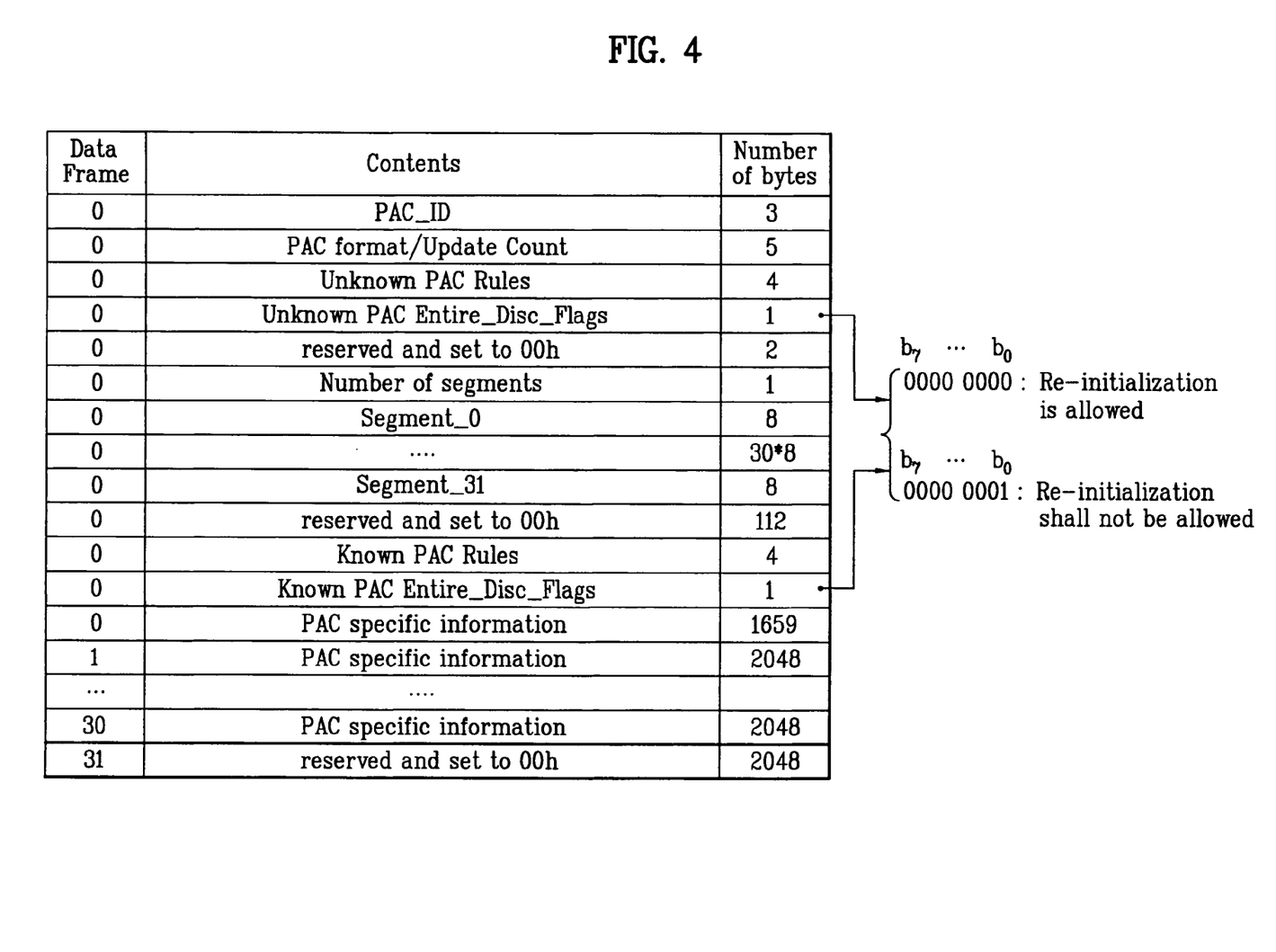

FIG. 4 illustrates the control information within the "Known PAC Entire_Disc_flags" field and the "Unknown PAC Entire_Disc_flags" field, among the control information recorded in the PAC cluster. Referring to FIG. 4, when the optical recording and reproducing apparatus is capable of identifying the PAC_ID, as the first control information, the "Known PAC Entire_Disc_flags" field provides control information that is applied to the entire disc. For example, among the 1 byte configuring the corresponding field, when a specific bit (b0) is "0", disc re-initialization is authorized. And, when the specific bit (b0) is "1", disc re-initialization is not authorized. Accordingly, the remaining bits (b1~b7) may be used as another control information applied to the entire disc performing other functions. However, in FIG. 4, the bits (b1~b7) have been reserved for future usage, and so, all of the bits are set as "0". As the second control information, the "Unknown PAC Entire_Disc_flags" field is defined identically as the "Known PAC Entire_Disc_flags" field, which is the first control information. Therefore, for example, by setting the "Known PAC Entire_Disc_flags" field as "0000 0000", the re-initialization of the disc is authorized, if the PAC_ID can be identified. And, by setting the "Unknown PAC Entire_Disc_flags" field within the same PAC cluster as "0000 0001", the re-initialization of the disc is not authorized, if the PAC_ID cannot be identified.

Figure 5:
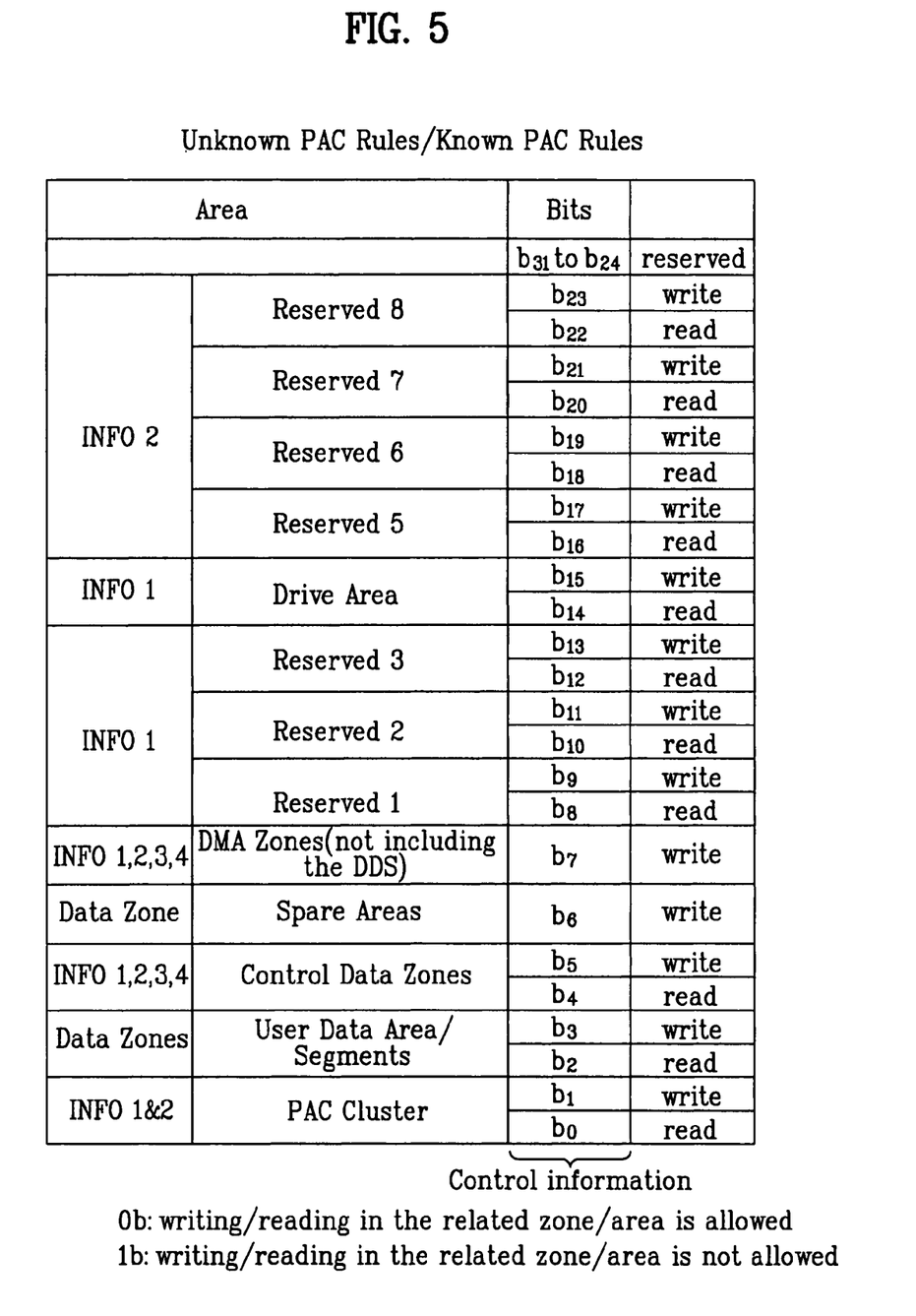
FIG. 5 illustrates "Unknown PAC rules" and "Known PAC rules" among the PAC cluster information within the recording medium according to the present invention.

FIG. 5 illustrates "Unknown PAC rules" and "Known PAC rules" among the PAC cluster information within the recording medium according to the present invention. As the first control information, if the optical recording and reproducing apparatus can identify the PAC_ID, the "Known PAC Rules" field provides control information whether recording (or writing) or reproduction (or reading) data to/from a specific area of the disc is authorized or not. Additionally, as the second control information, if the optical recording and reproducing apparatus cannot identify the PAC_ID, the "Unknown PAC Rules" field provides control information whether recording (or writing) or reproduction (or reading) data to/from a specific area of the disc is authorized or not.

The "Known PAC Rules" field and the "Unknown PAC Rules" field, each being formed of 4 bytes (b0~b3), have the same structure. Herein, in accordance with a pre-defined rule, a specific bit becomes a flag information indicating whether recording (or writing) or reproducing (or reading) is authorized in a specific area. More specifically, for example, "bit b0" and "bit b1" are used as control information indicating authorization of writing or reading within each PAC cluster. And, "bit b2" and "bit b3" are used as control information indicating authorization of writing or reading within each user data area. Accordingly, when a specific segment area is designated, each of the "bit b2" and the "bit b3" from the "Unknown PAC Rules" field is used as control information indicating authorization of writing or reading within each segment.

Additionally, as shown in FIG. 5, the other bits (b4~b23) are also used as control information indicating authorization of writing or reading within each area that requires writing or reading control within the optical disc shown in FIG. 1. Accordingly, among the bits that are provided from the "Known PAC Rules" field and the "Unknown PAC Rules" field, "0b" may be defined to authorize writing or recording of data on a corresponding area. "1b" may be defined to deny authorization of the writing or recording of data on a corresponding area. However, in the "Known PAC Rules" field, even when the specific bit is "1b", the specific bit is not defined to unconditionally deny authorization of the writing or recording of data. Instead, it may be defined to conditionally authorize writing or reading of data on a corresponding area. For example, input of a password may be required in order to authorize the writing and reading of data. Conversely, in the "Unknown PAC Rules" field, even when the specific bit is "1b", the specific bit is defined to unconditionally deny authorization of the writing or recording of data, without exceptions.

Therefore, as another embodiment of the present invention, the "Known PAC Rules" field may not be defined. And, in this case, instead of being controlled by the "Known PAC Rules" field, the writing and reading of the optical recording and reproducing apparatus is controlled by pre-programming the control method for a specific "PAC_ID" on a firmware. This will be described in more detail in a later process with reference to FIG. 8.

Figure 6:
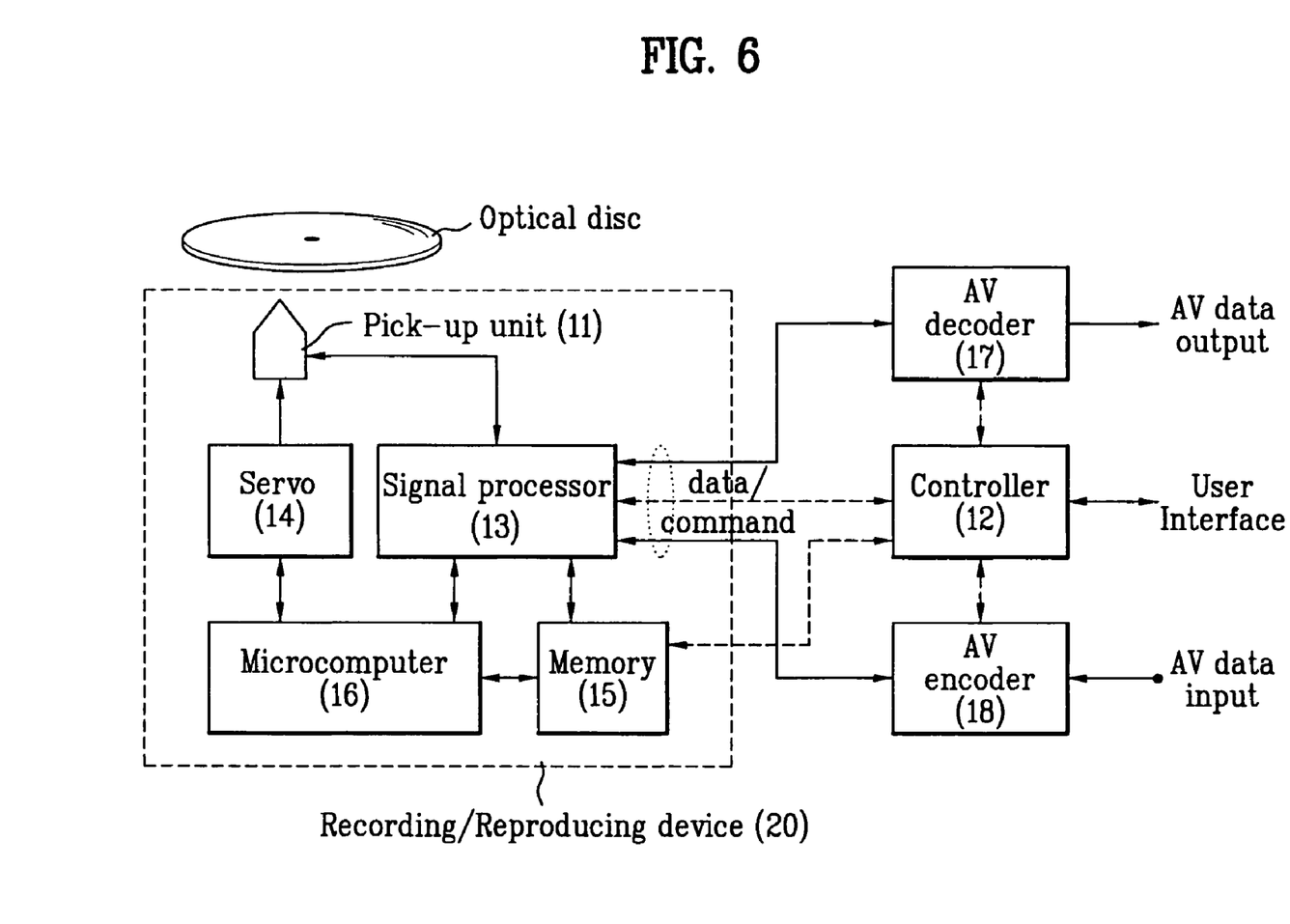
FIG. 6 illustrates an optical recording and reproducing apparatus according to the present invention.
Figure 7:
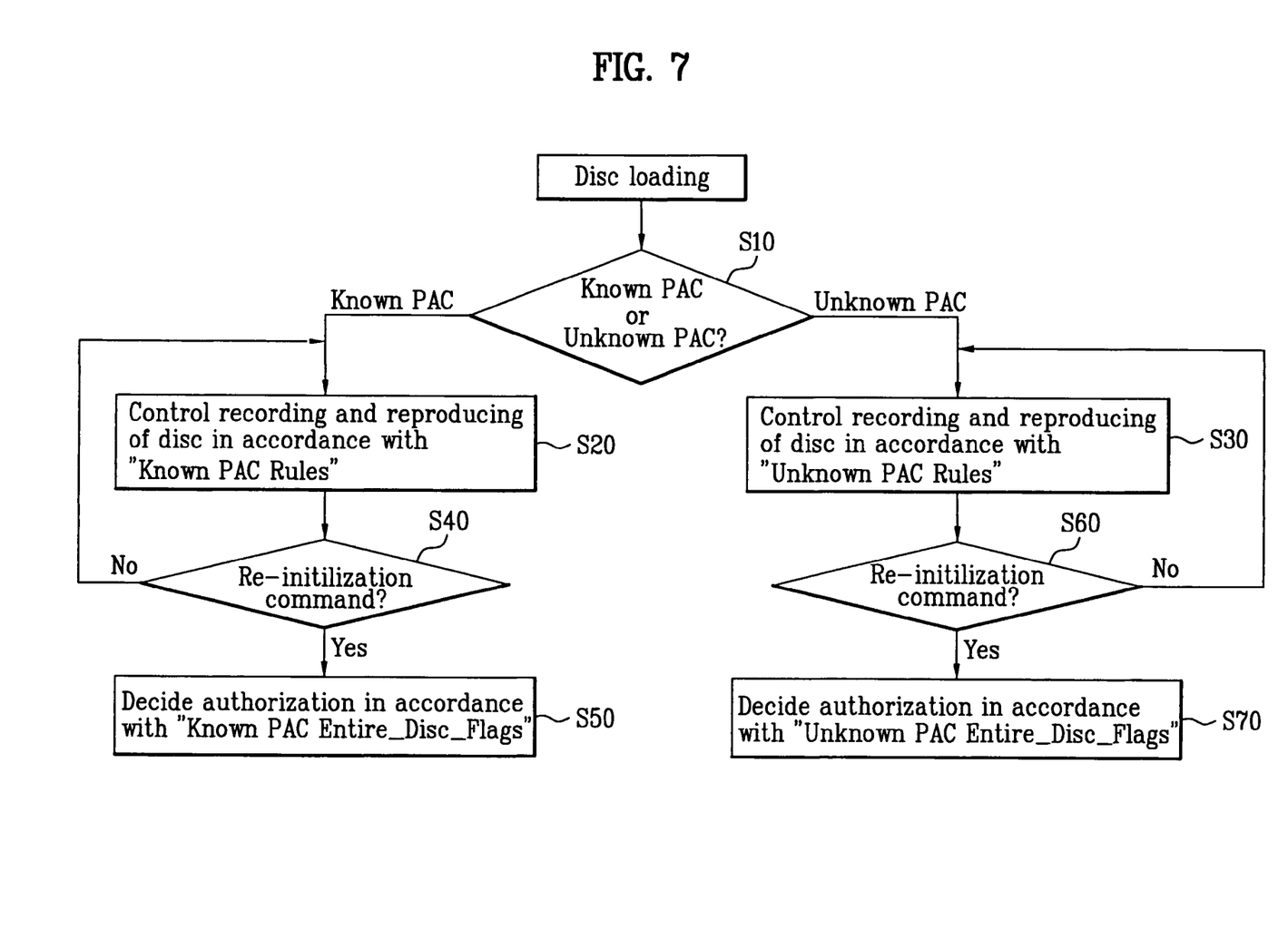
FIGS. 7 and 8 illustrate flow charts of an example of a method for recording and/or reproducing data of the recording medium according to the present invention.
Figure 8:
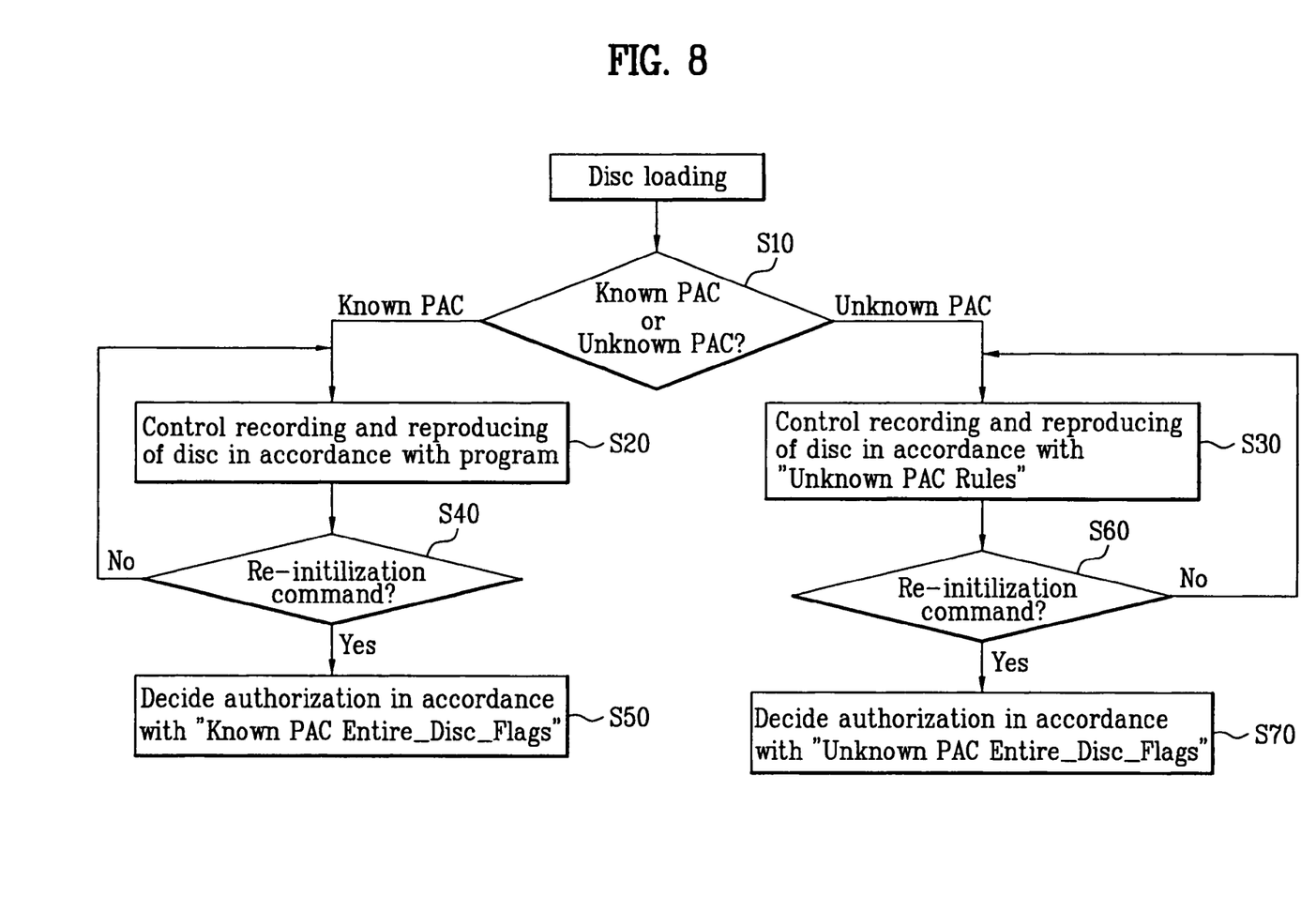

FIG. 6 to FIG. 8 illustrate an optical recording and reproducing apparatus and a method for controlling recording and reproducing of data within the recording medium according to the present invention. FIG. 6 illustrates an optical recording and reproducing apparatus according to the present invention, which broadly includes a recording/reproducing device 20 and a controller 12. The recording/reproducing device 20 includes a pick-up unit 11 for reading data and management information recorded on the optical disc, a servo 14 controlling the operations of the pick-up unit 11, a signal processor 13 either recovering the reproduction signal received from the pick-up unit 11 to a desired signal value, or modulating a signal to be recorded to an optical disc recordable signal and transmitting the modulated signal to the pick-up unit 11, a memory 15 for temporarily storing the management information and so on read from the optical disc, and a microcomputer 16 controlling the above operations. An apparatus only including the recording/reproducing device 20 is referred to as a "drive".

Also, a controller 12 controls the overall operation of the optical recording and reproducing apparatus. The controller 12 receives a user command through a user interface and transmits the received user command to the microcomputer 16, so that operation of the apparatus can be controlled in accordance with the user command. Most particularly, the controller 12 uses the disc management information transmitted from the recording and reproducing device 20 and creates a recording (or writing) and reproducing (or reading) command. Thereafter, the controller 12 transmits the command back to the recording and reproducing device 20. In addition, an AV decoder 17 performs final decoding of output data in accordance with the controls of the controller 12. And, in order to perform the function of recording a signal on the optical disc, an AV encoder 18 converts an input signal into a signal of a specific format (e.g., an MPEG-2 transport stream) depending upon the controls of the controller 12 and, then, provides the converted signal to the signal processor 13.

Accordingly, in the method for controlling the recording and reproducing of data using the PAC area, the operations of the recording/reproducing device 20 and the controller 12 will now be described in detail. The recording/reproducing device 20 reads the control information recorded for each of the at least one PAC cluster of the PAC area within the recording medium. However, the recording/reproducing device 20 must verify whether the corresponding PAC cluster can be identified by the read identification information (PAC_ID) for each PAC cluster. If the PAC cluster can be identified, the recording and reproducing of the recording medium is controlled by a first control information (e.g., the "Known PAC Rules" field and the "Known PAC Entire_Disc_flags" field) within the PAC cluster. Conversely, if the PAC cluster cannot be identified, the recording and reproducing of the recording medium is controlled by a second control information (e.g., the "Unknown PAC Rules" field and the "Unknown PAC Entire_Disc_flags" field) within the PAC cluster. Furthermore, in accordance with the first and second control information read from the reproducing/recording device 20, the controller 12 selectively transmits a data record/reproduce (or write/read) command or a re-initialization command to the reproducing/recording device 20. Regarding the reproducing/recording device 20 of the present invention, this device is named as a accessing unit.

FIG. 7 illustrates a flow chart of an example of a method for controlling the recording and/or reproduction of the recording medium according to the present invention. When the optical disc is loaded, the microcomputer 16 within the recording/reproducing device 20 verifies whether the PAC cluster within the lead-in area is a "Known PAC" cluster or an "Unknown PAC" cluster in accordance with the PAC_ID (S10). Thereafter, when the PAC cluster is identified as a "Known PAC" cluster, the recording/reproducing (or writing/reading) of data is controlled by the first control information within the corresponding PAC cluster, and most particularly by the "Known PAC Rules" field (S20). And, when the recording/reproducing device 20 receives a re-initialization command from the controller 12 (S40), the device verifies whether re-initialization is authorized based on the first control information, and most particularly based on the "Known Entire_Disc_flags" field, and then performs re-initialization only when it is authorized (S50). On the other hand, when the PAC cluster is identified as an "Unknown PAC" cluster, the recording/reproducing (or writing/reading) of data is controlled by the second control information within the corresponding PAC cluster, and most particularly by the "Unknown PAC Rules" field (S30). And, when the recording/reproducing device 20 receives a re-initialization command from the controller 12 (S60), the device verifies whether re-initialization is authorized based on the second control information, and most particularly based on the "Unknown Entire_Disc_flags" field, and then performs re-initialization only when it is authorized (S70).

FIG. 8 illustrates a flow chart of another example of a method for controlling the recording and/or reproduction of the recording medium according to the present invention. As compared FIG. 7, FIG. 8 illustrates an example when the "Known PAC Rules" field within the PAC cluster is not used. More specifically, when the "Known PAC Rules" field is applied, this signifies that the "PAC_ID" can already be identified. In this case, when developing the optical recording and reproducing apparatus, a control method (rule) corresponding to an already known "PAC_ID" is generally programmed within the microcomputer 16. Therefore, the recording and reproduction of the disc (or recording medium) can be controlled without having to necessarily use the "Known PAC Rules" field. Accordingly, referring to FIG. 8, Step 20 does not use the "Known PAC Rules" field, and instead the step follows the programmed control method (rule). The rest of the steps are identical to those shown in FIG. 7, and the description of the same will, therefore, be omitted for simplicity.

As described above, by using the recording medium, and the method and apparatus of controlling the access to the recording medium according to the present invention, data can be recorded on the recording medium and reproduced from the recording medium with more efficiency.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of controlling an access to a recording medium, the method comprising:
    extracting physical access control (PAC) information prerecorded on a recording medium;
    extracting a PAC identification from the PAC information;
    controlling an access to the recording medium using first control information included in the PAC information when the PAC identification is known; and
    controlling the access to the recording medium using second control information included in the PAC information when the PAC identification is unknown.

2. The method of claim 1, wherein the PAC information comprises a PAC cluster.

3. The method of claim 2, wherein the first control information comprises a Known PAC Rules field which defines PAC rules applicable to known PAC clusters.

4. The method of claim 2, wherein the second control information comprises an Unknown PAC Rules field which defines PAC rules applicable to unknown PAC clusters.

5. The method of claim 2, wherein the first control information comprises a Known PAC Entire_Disc_Flags field which defines whether re-initialization of the recording medium is permitted or not.

6. The method of claim 2, wherein the second control information comprises an Unknown PAC Entire_Disc_Flags field which defines whether re-initialization of the recording medium is permitted or not.

7. A method of controlling an access to a recording medium, the method comprising:
    extracting physical access control (PAC) information prerecorded on a recording medium;
    extracting a PAC identification from the PAC information;
    determining whether re-initialization of the recording medium is permitted based upon first control information included in the PAC information when the PAC identification is known;
    determining whether the re-initialization is permitted based upon second control information included in the PAC information when the PAC identification is unknown; and
    controlling the access to the recording medium for the re-initialization of the recording medium when it is permitted by the first or second control information.

8. The method of claim 7, wherein the PAC information comprises a PAC cluster.

9. The method of claim 8, wherein the first control information comprises a Known PAC Entire_Disc_Flags field which indicates whether the re-initialization is permitted.

10. The method of claim 8, wherein the second control information comprises an Unknown PAC Entire_Disc_Flags field which indicates whether the re-initialization is permitted.

11. A method of controlling an access to a recording medium, the method comprising:
    extracting physical access control (PAC) information prerecorded on a recording medium;
    extracting a PAC identification from the PAC information;
    determining whether an access to at least one specific area of the recording medium is permitted based upon first control information included in the PAC information when the PAC identification is known;

determining whether the access is permitted based upon second control information included in the PAC information when the PAC identification is unknown; and accessing to the at least one specific area of the recording medium when it is permitted.

12. The method of claim 11, wherein accessing to the specific area of the recording medium comprises recording data onto the specific area.

13. The method of claim 11, wherein accessing to the specific area of the recording medium comprises reproducing data pre-recorded in the specific area.

14. The method of claim 11, wherein the physical access control information comprises a physical access control (PAC) cluster.

15. The method of claim 14, wherein the first control information comprises a Known PAC Rules field which indicates whether the access is permitted.

16. The method of claim 14, wherein the second control information comprises an Unknown PAC Rules field which indicates whether the access is permitted.

17. A recording medium comprising:
a lead-in area comprising a physical access control (PAC) area in which at least one PAC cluster is recorded, each PAC cluster comprising a PAC identification, first control information, and second control information, wherein the first control information indicates whether an access to at least one specific area of the recording medium is permitted when the PAC identification is known to an access system, and the second control information indicates whether the access is permitted when the PAC identification is unknown to the access system.

18. The recording medium of claim 17, wherein the first control information comprises a Known PAC Rules field which indicates whether the access is permitted.

19. The recording medium of claim 17, wherein second control information comprises an Unknown PAC Rules field which indicates whether the access is permitted.

20. A recording medium comprising:
a lead-in area comprising a physical access control (PAC) area in which at least one PAC cluster is recorded, each PAC cluster comprising a PAC identification, first control information, and second control information, wherein the first control information indicates whether re-initialization of the recording medium is permitted when the PAC identification is known to an access system, and the second control information indicates whether the re-initialization is permitted when the PAC identification is unknown to the access system.

21. The recording medium of claim 20, wherein the first control information comprises a Known PAC Entire_Disc_Flags field which indicates whether the re-initialization is permitted.

22. The recording medium of claim 20, wherein the second control information comprises an Unknown PAC Entire_Disc_Flags field which indicates whether the re-initialization is permitted.

23. An apparatus of controlling an access to a recording medium, the apparatus comprising:
an accessing unit configured to extract physical access control (PAC) information pre-recorded on a recording medium, to extract a PAC identification from the PAC information, to determine whether an access to at least one specific area of the recording medium is permitted based upon first control information included in the PAC information when the PAC identification is known, and to determine whether the access is permitted based upon second control information included in the PAC information when the PAC identification is unknown; and
a controller configured to control the access to the at least one specific area based upon the first or second control information.

24. An apparatus of controlling an access to a recording medium, the apparatus comprising:
an accessing unit configured to extract physical access control (PAC) information pre-recorded on a recording medium, to extract a PAC identification from the PAC information, to determine whether re-initialization of the recording medium is permitted based upon first control information included in the PAC information when the PAC identification is known, and to determine whether the re-initialization is permitted based upon second control information further included in the PAC information when the PAC identification is unknown; and
a controller configured to control the access to the recording medium for the re-initialization of the recording medium when it is permitted by the first or second control information.

* * * * *